Sept. 8, 1953
R. E. SEELY
2,651,696
THERMAL OVERLOAD SWITCH
Filed April 12, 1952
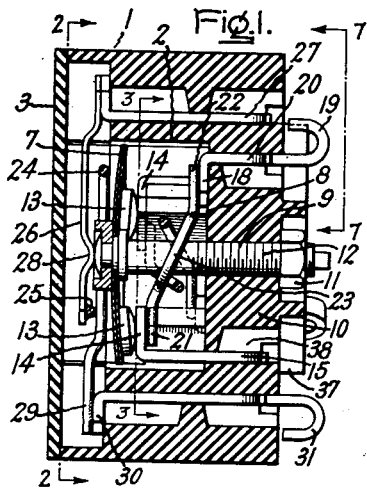
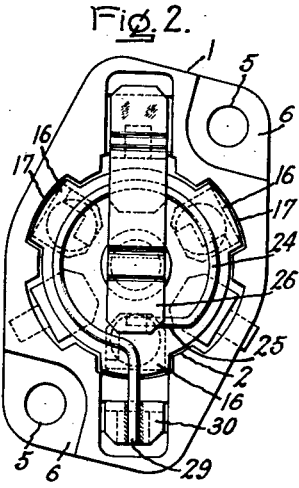
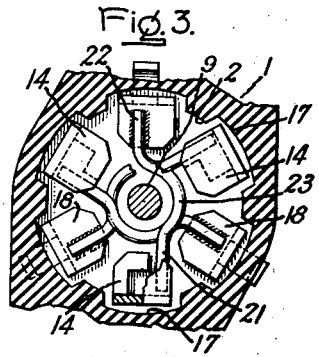
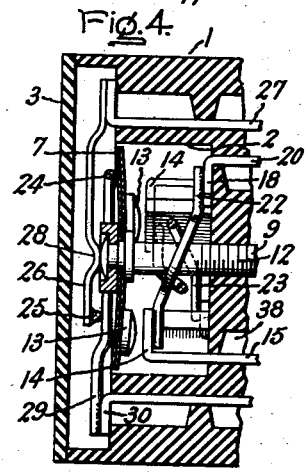
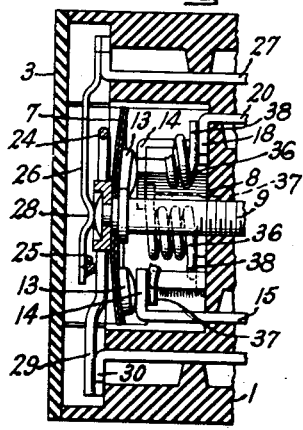
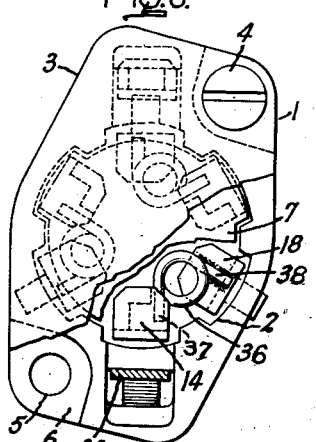
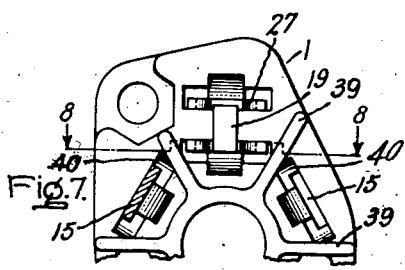
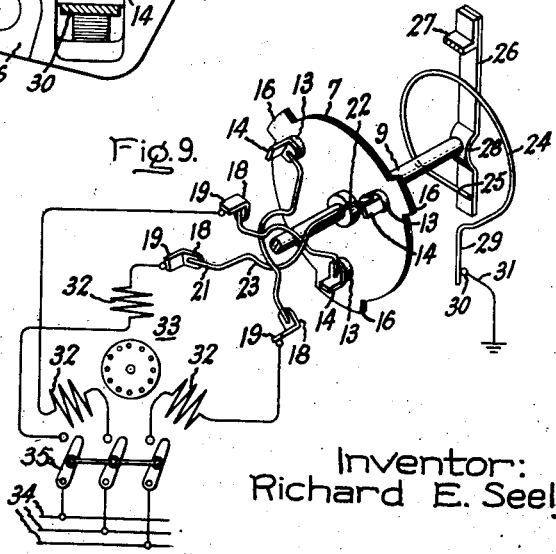
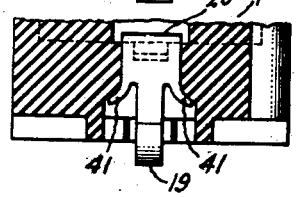
Inventor:
Richard E. Seely,
by Ernest H. Britton
His Attorney.

Patented Sept. 8, 1953

2,651,696

UNITED STATES PATENT OFFICE 2,651,696

THERMAL OVERLOAD SWITCH

Richard E. Seely, Fort Wayne, Ind., assignor to General Electric Company, a corporation of New York Application April 12, 1952, Serial No. 282,031

5 Claims. (Cl. 200—122)

1

This invention relates to thermal overload switches, and more particularly to switches of this type for thermally protecting plural phase alternating current windings of motors, alternators, transformers, etc.

In my copending application Serial No. 276,825, filed March 15, 1952 and assigned to the assignee of the present application, it is pointed out that in the design of three-phase alternating current windings, it is desirable to provide thermal protection for each phase of the windings independently of the other phases. When the three-phase windings are Y-connected, it is additionally desirable that the thermal overload device not only be responsive to excessive temperature in each of the three winding phases independently of the other phases, but also that the device open the circuits of the windings by breaking the Y of the Y-connection. The above referred to application further points out that it is frequently considered desirable in the case of Y-connected three-phase windings to ground the neutral and it is therefore also desirable to provide thermal protection in the grounded neutral in order to secure complete protection when one or two of the power supply lines may be opened.

The present application is specifically concerned with an improved thermal overload device for use in the circuit described in the above referred to application and has as its principal object the provision of an improved thermal overload switch of the bimetallic snap-acting disc type for plural phase alternating current windings characterized by its compact construction and rapid response.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention in its broadest aspects provides a thermally responsive element, such as a bimetallic snap-acting disc, having a plurality of movable contacts mounted on one side thereof and a plurality of stationary contacts respectively cooperating with the movable contacts. The thermally responsive element is adapted to move from a first stable position in which the contacts are closed into a second stable position to open the contacts responsive to a predetermined temperature. Each of the stationary contacts has a heating device, such as a heating re-

2 sistance connected thereto and arranged in heat transfer relationship with the thermally actuated element and on one side thereof. These heating elements are adapted to be respectively connected in series circuit relation with the windings of the motor, as described in the above referred to application. Another heating device, such as a resistance element, is connected to the thermally actuated element and arranged in heat transfer relationship therewith and on the other side thereof from the first mentioned heating elements, this heating element being adapted to be connected to a ground.

In the drawing, Fig. 1 is a cross-sectional view of one embodiment of this invention; Fig. 2 is a top view of the device of Fig. 1 with the cover removed; Fig. 3 is a fragmentary cross-sectional view of the improved thermal overload switch of Fig. 1 taken along the line 3—3 of Fig. 1; Fig. 4 is a fragmentary cross-sectional view of the device of Fig. 1 showing the contacts opened; Fig. 5 is a fragmentary cross-sectional view of a modified form of my improved thermal overload switch; Fig. 6 is a top view of the device of Fig. 5 showing the cover partially broken away; Fig. 7 is a fragmentary view of the bottom of the device of Fig. 1 as seen along the lines 7—7 thereof; Fig. 8 is a fragmentary cross-sectional view taken along the line 8—8 of Fig. 7; and Fig. 9 is a schematic illustration showing the connection of my improved thermal overload switch with a three-phase alternating current motor.

Referring now to Figs. 1, 2, 3, 4, 7 and 8, the improved thermal overload switch of this invention is shown as comprising the body portion 1 formed of suitable insulating material, such as a molded plastic. The body portion 1 has a substantially circular cavity 2 formed therein, in which the principal elements of the device are arranged. The cavity 2 may be closed by a suitable cover member 3, which may be secured in any suitable manner as by screws 4 engaging tapped openings 5 formed in suitable bosses 6 on the body portion 1.

The essential component of this device is a bimetallic snap-acting disc 7 positioned in the cavity 2, substantially filling the opening thereof. The bimetallic disc 7 is spaced from the bottom 8 of the cavity 2 and is supported by a suitable post member 9 extending through the bottom 10 of the body portion 1. A suitable nut 11 threadingly engaging threads 12 formed on the post 9 permits adjustment of the operating characteristics of the disc 7.

A plurality of evenly spaced movable contacts 13 are mounted on the inner side of the disc 7 within the cavity 2. The movable contacts 13 cooperate with stationary contacts 14 within the cavity 2, the stationary contacts 14 being spaced from the bottom 8 of the cavity 2 and having extension portions 15 secured to the bottom portion 10 of the body portion 1. Ears 16 are formed on the disc 7 and are arranged in recesses 17 in the wall of the cavity 2, the stationary contacts 14 having their extension portions 15 also arranged in the recesses 17.

A plurality of evenly spaced terminal members are provided having internal portions 18 arranged within the cavity 2 and abutting the bottom 8 thereof, and external portions 19 for making the external connections to the device, leg portion 20 of the terminal members being secured in the bottom portion 10 of the body portion 1. In order to provide for thermally affecting the disc 7, which being of the snap-acting type has a first stable position as shown in Fig. 1 with the contacts 13 and 14 closed and a second stable position as shown in Fig. 4 into which it moves responsive to a predetermined temperature with the contacts 13 and 14 open, a plurality of resistance heating elements are provided interconnecting the stationary contacts 14 and the terminal portions 18. Each of these resistance heating elements has a first portion 21 secured to the underside of the stationary contact 14, as by soldering, and a second portion 22 connected to the terminal portion 18 of the diametrically opposite terminal, with the intermediate portion 23 partially surrounding the post 9, as most clearly shown in Fig. 3. It is thus seen that the resistance heating elements respectively interconnect the stationary contacts and the terminals extending downwardly away from the bimetallic disc 7. Since these resistance heating elements are arranged within the cavity 2, they thermally affect the disc and when sufficiently heated will cause it to snap into the position shown in Fig. 4 to open the contacts 13 and 14.

In order to provide the ground protection, another resistance heating element 24 is provided having its end 25 connected to a spring member 26. The spring member 26, which is secured to the body portion 1 by means of a mounting member 27 has a portion 28 biased against the head of the bolt 9 which supports the bimetallic disc 7. Thus, the end 25 of the resistance heating element 24 is connected to the disc 7 while its end 29 is connected to another external terminal 30. This terminal is secured to the body portion 1 outside of the cavity 2 and has an external portion 31 to which a ground connection may be made.

Referring now to Fig. 9, it is seen that the external terminals 19 are adapted to be connected in series circuit relation with the winding phases 32 of a three-phase alternating current motor 33, the winding phases 32 being connected to a three-phase source of power (not shown) by means of lines 34 and three-pole switch 35. It will also be seen that the outer external terminal 31 is adapted to be connected to a ground. It will be readily apparent that the resistance elements in series with the motor windings are arranged on one side of the bimetallic snap-acting disc 7 while the ground resistance heating element 24 is arranged on the other side thereof and in a plane parallel with the plane of the disc. It will thus be readily seen that this device provides protection of each phase of the motor winding independently of the other phase, and that complete protection is provided in the event of opening of one or two of the supply lines by the use of the neutral heating element. General overload protection is, of course, provided uniformly by the phase heaters 23 and the bimetallic disc 7. While a bimetallic snap-acting disc 7 has been shown, it will be readily understood that any other suitable bimetallic or heat responsive element could be used in this construction.

Referring now to Figs. 5 and 6, in which like elements are indicated with like reference numerals, it is seen that the heating resistance elements take the form of coils 36 having their upper ends 37 suitably secured to the under sides of stationary contacts 14 and their lower ends 38 connected to the upper sides of terminal portions 18. It will be readily seen that the heating resistance coils 36 are connected between adjacent stationary contacts and terminal portions and that they are arranged vertically with respect to the bimetallic disc 7. The neutral resistance heating element 24 is again arranged on the side of the bimetallic disc 7 remote from the phase heating elements 36 and in a plane parallel with the disc.

Referring now to Fig. 7 which shows a fragmentary view of the bottom of the switch of either Figs. 1 or 5, it is shown that a plurality of molded ribs 39 formed integral with the bottom 10 of the body portion 1 separate the external terminals 19 which project from the bottom 10 of the body 1. Fig. 7 also most clearly illustrates the equal spacing of the portions 15 of the stationary terminals 14 and their arrangement in slots 40 in the body portion 1. Fig. 8 illustrates the manner of retaining the terminals and also the stationary contact members in the body portion, it being seen that the connecting portion 20 between the external terminal 19 and the internal portion 18 has a pair of projections 41 formed thereon to secure the terminal in position. The projecting portions 15 of the stationary contacts 14, the connection portion intermediate the terminal 31 and its connection with the ground resistance heater 24, and the portion 27 of the mounting member for the spring 26 are also similarly formed.

It will now be readily apparent that this invention provides an improved thermally actuated overload switch for a plural phase alternating current winding arranged to provide protection for each winding phase of the electrical apparatus in addition to ground protection characterized by its compact construction. Furthermore, this switch is fast acting by virtue of the arrangement of the heating resistances in efficient heat transfer relationship with the bimetallic disc and by virtue of the heat as generated by current flowing through the bimetallic disc.

While I have shown and described particular embodiments of this invention, further modifications and improvements will occur to those skilled in the art. I desire it to be understood, therefore, that this invention is not limited to the forms shown and I intend in the appended claims to cover all modifications which do not depart from the spirit and scope of this invention.

What I claim as new and desire to secure by Letters Patent of the United States is:

1. A thermal overload switch for plural phase alternating current apparatus comprising a bimetallic snap-acting disc having a plurality of movable contacts mounted on one side thereof, a plurality of stationary contacts respectively cooperating with said movable contacts, said disc having a first stable position with said contacts closed and being adapted to move into a second stable position to open said contacts responsive to a predetermined temperature, a plurality of terminals spaced from said stationary contacts on the side thereof remote from said one side of said disc, a plurality of heating reistance coils respectively interconnecting said stationary contacts and said terminals for thermally affecting said disc, and another heating resistance having one end connected to said disc and its other end connected to another terminal, said other heating resistance being arranged in heat transfer relationship with the other side of said disc.

2. A thermal overload switch for plural phase alternating current apparatus comprising a bimetallic snap-acting disc having a plurality of movable contacts mounted on one side thereof, a plurality of stationary contacts respectively cooperating with said movable contacts, said disc having a first stable position with said contacts closed and being adapted to move into a second stable position to open said contacts responsive to a predetermined temperature, a plurality of terminals respectively arranged diametrically opposite said stationary contacts and spaced therefrom on the side thereof remote from said one side of said disc, a plurality of heating resistances respectively interconnecting each of said stationary contacts and the terminal diametrically opposite therefrom, and another heating resistance having one end connected to said disc and its other end connected to another terminal, said other heating resistance being arranged in heat transfer relationship with the other side of said disc.

3. A thermal overload switch for plural phase alternating current apparatus comprising a body portion having a cavity formed therein, a bimetallic snap-acting disc arranged in said cavity substantially filling the opening thereof and spaced from the bottom thereof defining a compartment, a plurality of movable contacts mounted on the inner side of said disc in said compartment, a plurality of stationary contacts mounted in said body portion in said compartment and spaced from the bottom thereof, said stationary contacts respectively cooperating with said movable contacts, a post in said compartment and mounted on said body portion for supporting said disc, a plurality of evenly spaced terminals mounted on said body portion in said compartment adjacent the bottom thereof and spaced from said stationary contacts, said disc having a first stable position with said contacts closed and being adapted to move into a second stable position to open said contacts responsive to a predetermined temperature, each of said stationary contacts having a heating resistance connected thereto and extending one of said terminals, said heating resistances being arranged in heat transfer relationship with said one side of said disc, a spring member arranged on the other side of said disc having one end mounted on said body portion and its other end biased against the end of said post and another heating resistance arranged on said other side of said disc with one end connected to said other end of said spring member and its other end connected to another terminal.

4. A thermal overload switch for plural phase alternating current apparatus comprising a body portion having a cavity formed therein, a bimetallic snap-action disc arranged in said cavity substantially filling the opening thereof and spaced from the bottom thereof defining a compartment, a plurality of evenly spaced movable contacts mounted on the inner side of said disc in said compartment, a plurality of evenly spaced stationary contacts mounted on said body portion in said compartment and spaced from the bottom thereof, said stationary contacts respectively cooperating with said movable contacts, a post in said compartment and mounted on said body portion for supporting said disc, a plurality of evenly spaced terminals mounted on said body portion in said compartment adjacent the bottom thereof and spaced from said stationary contacts, a plurality of heating resistances in said compartment respectively connecting each of said stationary contacts and the one of said terminals substantially oppositely disposed therefrom for thermally affecting said disc, said heating resistances extending away from said inner side of said disc toward said bottom of said cavity and having a loop portion partially surrounding said post, and another heating resistance having one end connected to the outer side of said disc and its other end connected to another terminal mounted on said body portion outside of said cavity for thermally affecting said disc.

5. A thermal overload switch for plural phase alternating current apparatus comprising a body portion having a cavity formed therein, a bimetallic snap-action disc arranged in said cavity substantially filling the opening thereof and spaced from the bottom thereof defining a compartment, a plurality of evenly spaced movable contacts mounted on the inner side of said disc in said compartment, a plurality of evenly spaced stationary contacts mounted on said body portion in said compartment and spaced from the bottom thereof, said stationary contacts respectively cooperating with said movable contacts, a post in said compartment and mounted on said body portion for supporting said disc, a plurality of evenly spaced terminals mounted on said body portion in said compartment adjacent the bottom thereof and spaced from said stationary contacts, a plurality of heating resistance coils in said compartment respectively connecting said stationary contacts and said terminals for thermally affecting said disc, said heating resistance coils being vertically arranged with respect to said disc, and another heating resistance having one end connected to the outer side of said disc and its other end connected to another terminal mounted on said body portion outside of said cavity for thermally affecting said disc.

RICHARD E. SEELY.

References Cited in the file of this patent

UNITED STATES PATENTS

| Number | Name | Date |
|---|---|---|
| 2,309,207 | Newton | Jan. 26, 1943 |
| 2,414,531 | Johns | Jan. 21, 1947 |